United States Patent Office 2,986,004
Patented May 30, 1961

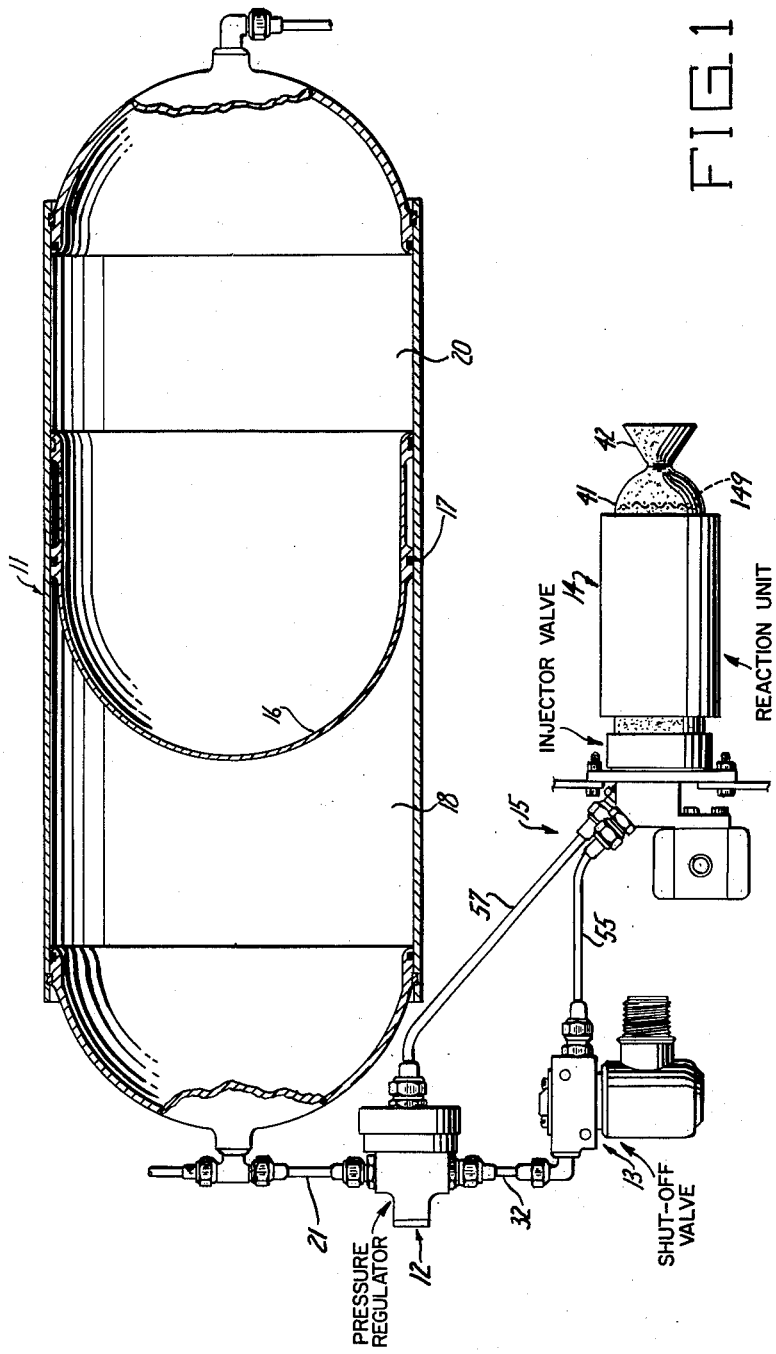

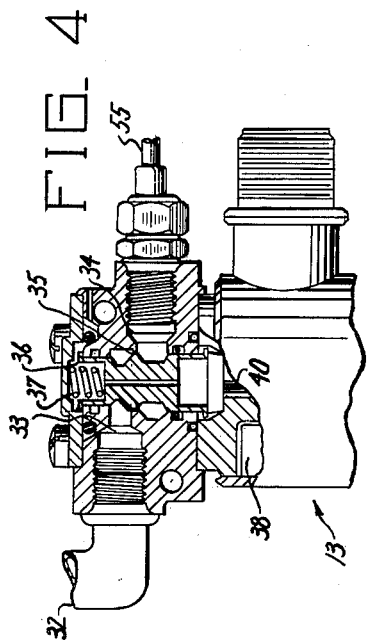
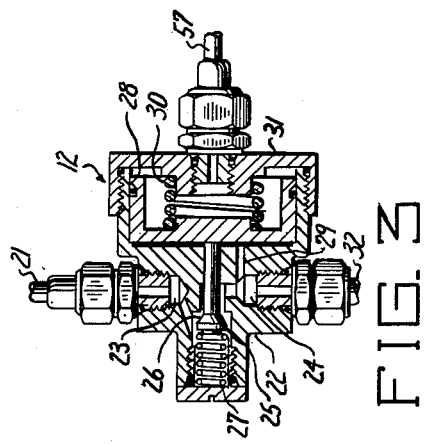
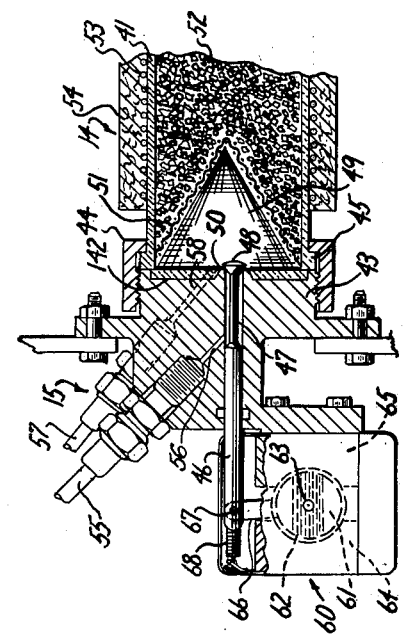
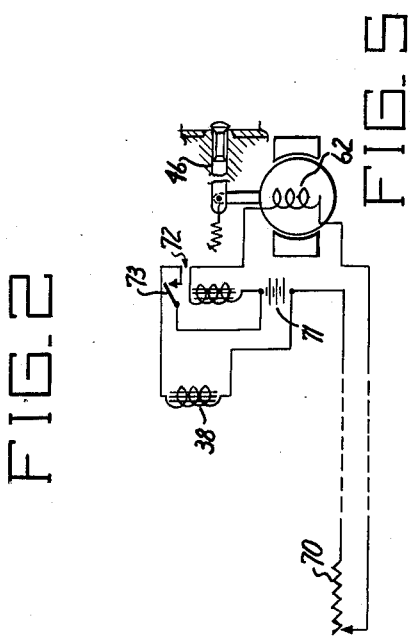

2,986,004

ELECTROMAGNETICALLY CONTROLLABLE FLUID PROPELLANT TYPE ROCKET MOTOR SYSTEM

John D. McKenney, Newport Beach, Calif., assignor to Clary Corporation, San Gabriel, Calif., a corporation of California Filed June 30, 1958, Ser. No. 745,666

5 Claims. (Cl. 60—35.6)

This invention relates to rocket motors and has particular reference to rocket motors of the liquid, monopropellant type.

The application of rocket motors of the above type for such purposes as to maneuver or propel a vehicle, space satellite, or the like, generally requires a suitable control instrumentality whereby the thrust of the motor may be adjustably controlled as desired, either from a point adjacent the motor or from a point remote therefrom.

The control of the thrust of rocket motors of the fluid type presents certain problems which have heretofore been solved only by the employment of rather highly complex, and in many cases unreliable, systems. For example, one factor affecting the thrust characteristics of such a motor is the supply pressure of the fluid propellant which is generally contained in a storage reservoir under pressure that varies as the propellant is being used up. Also, the pressure in the combustion or decomposition chamber resulting from the combustion or decomposition of the propellant, may vary due to starting conditions, temperature changes in the chamber, temperature of the propellant, etc.

It therefore becomes a principal object of the present invention to provide a control mechanism for variably controlling the thrust of a rocket motor of the above type.

Another object is to provide a variable thrust control system for rocket motors of the above type which is simple and effective in operation.

A further object is to provide an electrically controlled variable thrust control system for rocket motors of the above type wherein the thrust of the rocket is directly proportional to the value of an electric control signal applied thereto.

The manner in which the above and other objects of the invention are accomplished will be readily understood on reference to the following specification when read in conjunction with the accompanying drawings, wherein:

Fig. 1 is a schematic diagram illustrating the arrangement of various components constituting a preferred form of the present invention.

Fig. 2 is a sectional view showing part of the decomposition chamber and the propellant injector valve associated therewith.

Fig. 3 is a sectional view of the pressure regulator.

Fig. 4 is a side view, partly in section, of the shut-off valve.

Fig. 5 is a schematic diagram of the electric circuit connections of the system.

Referring to the drawings, the system, in general, comprises a propellant accumulator, generally indicated at 11, for storing the liquid propellant under pressure, a pressure regulator 12, a line shut-off valve 13, a reaction or decomposition unit 14 and a propellant injector valve 15 forming an injector.

The propellant chosen for the present disclosure is of the mono-propellant type commonly known as hydrazine ($N_2H_4$). However, other types of liquid monopropellant fuels may be used with obvious modifications of the system as dictated by the characteristics of the propellant.

The accumulator 11 comprises a cylindrical shell which is divided by a sliding piston 16. A sealing ring 17 is located in a groove formed around the periphery of the piston to slideably seal the accumulator into two separate chambers 18 and 20. The liquid propellant is located in the left hand chamber 18 and an inert gas, such as nitrogen, is introduced under a relatively high pressure into the right hand chamber 20. The chamber 18 of the accumulator is connected by a line 21 to the inlet of the pressure regulator 12.

Referring to Fig. 3, the pressure regulator 12 comprises a valve body 22 having an inlet port 23 connected to the line 21 and an outlet port 24. The ports 23 and 24 are connected by a passage forming a valve seat 25 which cooperates with a valve element 26 adapted to control the flow of propellant through the regulator.

The valve element 26 is slideable endwise and is urged by a relatively light compression spring 27 against a piston 28 slideably mounted in a piston chamber formed in the valve body 22. A compression spring 30, relatively stronger than spring 27, is interposed between the piston 28 and a cap 31 threaded onto the valve body 22 to enclose the piston chamber. A passage 29 communicates the outlet port 24 or downstream side of the pressure regulator with the left hand end of the piston chamber.

The outlet port 24 of the regulator is connected through a line 32 with the inlet port 33 (Fig. 4) of the normally closed shut-off valve 13. The valve 13 has an outlet port 34 connected to the inlet port 33 by a passage forming a valve seat 35. The latter cooperates with a valve element 36 slideable longitudinally in a bore formed in the body of the valve. A compression spring 37 normally holds the valve element against its seat 35 to thereby close the valve.

A solenoid coil 38 cooperates with an armature 40 engaging the lower end of the valve element 36 so that when the coil is energized, the armature will raise the valve element to thereby establish communication between the inlet and outlet ports.

The decomposition unit 14, forming a reaction chamber, comprises a cylindrical ceramic shell 41 terminating in an exhaust nozzle 42. At its inner end, the shell 41 is closed by an annular ceramic disk 142 embedded in the forward wall of the body 43 of the injector valve 15. The latter is preferably formed of aluminum or similar material having high heat conductivity characteristics.

The shell 41 is attached to the body 43 by a flanged nut 44 which is threaded on the valve body and engages a flange 45 formed on the inner end of the shell 41.

A valve pintle 46 is slideably mounted in a bore extending through the valve body 43 and opening into the inner end of the shell 41. The pintle has a section 47 of reduced diameter terminating in a conical head 48 which normally engages a valve seat 50 formed in the valve body 43.

The valve head 48 is effective, when the pintle is moved to the right, to direct the propellant onto a conical screen 51. The latter defines a gas generating chamber 49 and also serves to retain a catalyst bed 52 within the shell 41. At relatively high flow rates the valve head atomizes the propellant to spray the same outwardly in all directions against the screen 51.

In this disclosure, the catalyst comprises particles of aluminum oxide which are treated with the proper combination of metallic salts. At the rear of the shell 41, the catalyst is retained by screen 149.

A heating coil 53 is wrapped around the shell 41 to permit initial heating of the catalyst bed to the proper temperature to initiate spontaneous reaction of the propellant as the latter is sprayed onto the catalyst. The coil is enclosed in a protective sleeve 54 of heat insulating material.

A line 55 communicates the outlet port 34 of the shut-off valve 13 with an inlet passage 56 opening into the pintle bore adjacent the reduced diameter pintle section 47. A second line 57 communicates the piston chamber of the pressure regulator 12 (Fig. 3) with a passage 58 opening into the gas generating chamber 49 of the reaction unit whereby to communicate the reaction pressure within the shell 41 to the piston 28 of the pressure regulator.

The pintle 46 is operated by an electromagnetic actuator, generally indicated at 60. The latter comprises an armature 61 of a material having a high magnetic permeability and low magnetic retentivity, on which is wound an armature coil 62. The armature is pivotally supported at 63 and is located in the field of a permanent magnet, the pole pieces of which are shown at 64 and 65.

An arm 66 attached to the armature 61 is connected through a pin and slot coupling 67 to the pintle 46. When the coil 62 is energized, it will effect a clockwise movement of the armature against the action of a tension spring 68 extending between the pintle 46 and the frame of the actuator, whereby to move the pintle to the right.

The characteristics of the actuator 60 are such that the resultant propellant flow area effected by the pintle valve head 48 is directly proportional to the amplitude of the current applied to the armature coil 62. This is preferably obtained by forming the conical valve surface of the head 48 at an included angle of 90° and by so arranging the actuator 60 and its spring 68 that the displacement of the pintle is in direct proportion of the value of the applied current.

Referring to Fig. 5, the armature coil 62 is connected in series with a rheostat 70, a source of direct current potential 71 and the coil of a relay 72. The solenoid coil 38 (see also Fig. 4) of the shut-off valve 13 is connected in series with the normally open contacts 73 of the relay 72, across the current source 71. Accordingly, when the rheostat is positioned to effect a flow of current through the coil 62 to actuate the valve pintle 46 to any open position, the relay 72 will be energized to complete a circuit through the solenoid coil 38 and thus fully open the shut-off valve 13.

Describing the operation of the system, since in the normal state of rest of the motor, the valve 13 is closed and no pressure exists in the decomposition chamber, the downstream pressure developed in the outlet port 24 of the pressure regulator is sufficient to actuate the regulator piston 28 to the right to close the regulator valve 26.

Prior to operating the rheostat 70 to initiate operation of the motor, the chamber heating coil 53 is caused to heat the catalyst bed 52, which in practice must be heated to approximately 500° to effect catalytic decomposition of the propellant.

When the rheostat is actuated to energize the armature coil 62, the relay 72 will become energized to open valve 13, thereby reducing the pressure in the outlet port 24 of the regulator valve. This drop in pressure will permit spring 30 to open the regulator valve, in the absence of pressure in the decomposition chamber, sufficiently to permit an initial injection of the propellant into the decomposition chamber.

As the propellant decomposes in the chamber to develop a thrust in the exhaust nozzle 42, pressure built up therein is transmitted through the line 57 to the regulator piston 28, causing the same to further open the valve 26.

The regulator will accordingly follow the pressure developed in the decomposition chamber by the decomposition of the propellant and therefore it will be effective to maintain a constant differential between the pressure in the decomposition chamber and the pressure in the inlet passage 56. This will result in a thrust at the exhaust nozzle which is substantially directly proportional to the voltage applied to the coil 62 of the electromagnetic actuator.

Although I have described my invention in detail in its preferred embodiment and have therefore utilized certain terms and language herein, it is to be understood that the present disclosure is illustrative rather than restrictive and that changes and modifications may be resorted to without departing from the spirit or scope of the claims appended hereto.

Having thus described the invention, what I desire to secure by United States Letters Patent is:

1. Apparatus for introducing a liquid propellant into the reaction chamber of a thermal motor comprising a propellant injector communicating with said reaction chamber, electromagnetic means for controlling said injector to vary the cross sectional area of propellant flow therethrough into said reaction chamber in proportion to the value of electrical energy applied to said electromagnetic means, a circuit for applying variable electrical energy to said electromagnetic means, a container of propellant under pressure, said pressure varying as said propellant is withdrawn from said container, conduit means for conveying said propellant from said container to said injector, a pressure regulator in said conduit means, and means responsive to the pressure in said reaction chamber for controlling said pressure regulator to provide a constant differential between the pressure in the injector inlet and in said reaction chamber.

2. Apparatus for introducing a liquid propellant into the reaction chamber of a thermal motor comprising a propellant injector communicating with said reaction chamber, said injector including a displaceable valve device; electromagnetic means for displacing said valve device, said electromagnetic means being effective to displace said valve device an amount proportional to the amount of electrical energy applied to said electromagnetic means, an electric circuit for applying variable electrical energy to said electromagnetic means, said electromagnetic means and said valve device being so arranged that the cross sectional area of propellant flow controlled by said valve device is directly proportional to the value of electrical energy applied to said electromagnetic means, a container of propellant under pressure, said pressure varying as said propellant is withdrawn from said container, conduit means for conveying said propellant from said container to said injector, a pressure regulator in said conduit means, and means responsive to the pressure in said reaction chamber for controlling said pressure regulator to provide a constant differential between the pressure in the injector inlet and in said reaction chamber.

3. Apparatus for introducing a liquid propellant into the reaction chamber of a thermal motor comprising a propellant injector communicating with said reaction chamber, said injector including a displaceable valve device; electromagnetic means for displacing said valve device, a circuit for applying variable electrical energy to said electromagnetic means, said electromagnetic means and said valve device being so arranged that the cross sectional area of propellant flow controlled by said valve device is proportional to the value of electrical energy applied to said electromagnetic means, a container of propellant under pressure, said pressure varying as said propellant is withdrawn from said container, conduit means for conveying said propellant from said container to said injector, a pressure regulator in said conduit means, said pressure regulator including a regulating chamber, a movable chamber closure member in said regulating chamber, a valve operable by said closure member, said valve being in the path of flow of propellant in said conduit means, a second conduit means between the downstream side of said valve and said regulating chamber on one side of said closure member, and a third conduit means between said regulating chamber on the opposite side of said closure member and said reaction chamber, said valve and said closure member being so proportioned as to maintain a constant differential between the pressure in the injector inlet and in said reaction chamber.

4. Apparatus for introducing a liquid propellant into the reaction chamber of a thermal motor comprising a propellant injector communicating with said reaction chamber, said injector including a displaceable valve device; electromagnetic means for displacing said valve device, said electromagnetic means and said valve device being so arranged that the propellant flow area controlled by said valve device is directly proportional to the value of electrical energy applied to said electromagnetic means, a circuit for applying variable electrical energy to said electromagnetic means, a container of propellant under pressure, said pressure varying as said propellant is withdrawn from said container, conduit means for conveying said propellant from said container to said injector, a pressure regulator in said conduit means, mans responsive to the pressure in said reaction chamber for controlling said pressure regulator to provide a constant differential between the pressure in the injector inlet and in said reaction chamber, a normally closed valve in said conduit means, and means responsive to operation of said electromagnetic means for opening said valve.

5. Apparatus for introducing a liquid propellant into the reaction chamber of a thermal motor comprising a propellant injector communicating with said reaction chamber, electromagnetic means for controlling said injector to inject said propellant into said chamber at a rate of flow directly proportional to the value of electrical energy applied to said electromagnetic means, a circuit for applying variable electrical energy to said electromagnetic means, a container of propellant under pressure, said pressure varying as said propellant is withdrawn from said container, conduit means for conveying said propellant from said container to said injector, a pressure regulator in said conduit means, means responsive to the pressure in said reaction chamber for controlling said pressure regulator to provide a constant differential between the pressure in the injector inlet and in said reaction chamber, a normally closed valve in said conduit means, a second electromagnetic means for opening said valve, and means responsive to application of electrical energy to said first electromagnetic means for energizing said second electromagnetic means.

References Cited in the file of this patent
UNITED STATES PATENTS

| | | |
|---|---|---|
| 2,532,711 | Goddard | Dec. 5, 1950 |
| 2,623,354 | Best | Dec. 30, 1952 |
| 2,644,513 | Mock | July 7, 1953 |
| 2,648,190 | Maisner | Aug. 11, 1953 |
| 2,827,762 | Towns | Mar. 25, 1958 |
| 2,884,009 | Hetherington | Apr. 28, 1959 |

FOREIGN PATENTS

| | | |
|---|---|---|
| 719,946 | Great Britain | Dec. 8, 1954 |